(12) United States Patent
Chang

(10) Patent No.: US 7,118,655 B1
(45) Date of Patent: Oct. 10, 2006

(54) DIRECT SYNTHESIS OF HYDRAZINE THROUGH NITROGEN FIXATION BY MEANS OF TWO-PHOTON ABSORPTIONS

(75) Inventor: Ching-Sung Chang, 9907 Rosewood Hill Circle, Vienna, VA (US) 22182

(73) Assignee: Ching-Sung Chang, Vienna, VA (US)

(*) Notice: Subject to any disclaimer, the term of this patent is extended or adjusted under 35 U.S.C. 154(b) by 354 days.

(21) Appl. No.: 10/626,688

(22) Filed: Jul. 25, 2003

(51) Int. Cl.
*C01B 21/16* (2006.01)
*B01J 19/12* (2006.01)

(52) U.S. Cl. .................. 204/157.41; 423/407
(58) Field of Classification Search ............. 423/407; 204/157.41
See application file for complete search history.

(56) References Cited

U.S. PATENT DOCUMENTS 3,694,770 A * 9/1972 Burwell et al. ............ 372/90
4,124,466 A * 11/1978 Morrey .................. 204/157.41
4,336,230 A * 6/1982 Bethe et al. ........... 204/157.22
4,547,273 A * 10/1985 Ayers ....................... 205/440

FOREIGN PATENT DOCUMENTS

JP 60-60911 * 4/1985 ............. 204/157.1
TW 91135644 12/1972

OTHER PUBLICATIONS

Schmidt, E. W., "Hydrazine and its Derivatives," New York, John Wiley and Sons, 1984, p. 218-p. 219, no month.
Lide, David R., Editor-in-chief, "CRC Handbook of Chemisry and Physics," 82nd Edition, 2001-2002, p. 9-81-p. 9-84, and p. 10-164, no month.
Herzberg, Gerhard, "Molecular Spectra and Molecular Structure," 2nd Edition, D. Van Nostrand Company, Inc., 1950, p. 472-p. 477, no month.

* cited by examiner

Primary Examiner—Wayne A. Langel
(74) Attorney, Agent, or Firm—Takeuchi&Kubotera, LLP (57) ABSTRACT

Two methods and apparatuses are described for hydrazine synthesis through nitrogen fixation induced by photoexcitation of $N_2$. Both methods of photoexcitation of $N_2$ for hydrazine synthesis involve a two-photon absorption process. The first method of $N_2$ fixation with $H_2$ uses a high-energy short-pulsed Nd: YAG laser with wavelength of 1.06 μm. The two-photon absorption of $N_2$ is followed by a vibrational-vibrational (V—V) energy transfer that leads to a near-complete population inversion of $N_2$ vibrational states. The energy separation of these states is larger than the activation energy needed for $N_2H_4$ formation. The second method of $N_2$ fixation with $H_2O$ uses a high-energy short-pulsed blue laser with wavelength of 0.4 μm. The two-photon absorption at 0.4 μm pumps $N_2$ to a highly excited vibrational state, which has enough energy to both dissociate $H_2O$ into $H_2$ and $O_2$, and to react with $H_2$ to form $N_2H_4$ as in the above direct method of $N_2$ fixation with $H_2$.

18 Claims, 2 Drawing Sheets

DIRECT SYNTHESIS OF HYDRAZINE THROUGH NITROGEN FIXATION BY MEANS OF TWO-PHOTON ABSORPTIONS

FIELD OF THE INVENTION

The present invention relates to two nitrogen fixation methods using two-photon absorptions that excite $N_2$ from its vibrational state using nanosecond high-energy laser pulses of wavelengths near infrared and blue-purple ranges. This excited nitrogen is then made to interact to form hydrazine in either high-pressure $N_2$—$H_2$ gas mixtures or with $N_2$ embedded in water. Hydrazine formation based on this laser induced chemistry produces liquid hydrazine which, of practical interest, can exist at room temperature and atmospheric pressure.

BACKGROUND OF THE INVENTION

A number of experimental and theoretical efforts for producing hydrazine based on direct synthesis of $N_2$ and $H_2$ as well as preparation by nitrogen fixation have been undertaken during the past several decades. Most consisted of attempts to stimulate inert $H_2$ into bonding with $N_2$. At best, however, the end product was ammonia. Traces of $N_2H_4$ were detected in some cases, but the yield was in the fractional percent range and did not warrant commercial exploitation. Stimulation of the $N_2$—$H_2$ reaction by glow discharge, $\beta$-radiation, and $\alpha$-radiation has also been tried, but no practical results were obtained.

Some experimental efforts were made by Olin et al [J. Chem. Eng. Data, 6, 384 (1991)] under conditions of extreme pressure (667 MPa) and temperature (8000 K), such as those achieved for a few milliseconds in a ballistic piston apparatus containing $N_2$ and $H_2$. This method also failed to produce $N_2H_4$ from its elements. This is due to the fact that $N_2$ is a very inert molecule, making it very difficult to form any chemical compound directly from $N_2$. As will be explained later, the temperatures (~8000 K) turn out to be not high enough to overcome the activation energy requirement. Also the confinement time is too short for the reaction to go to completion. Nevertheless, the energy differentials involved in reductive fixation of $N_2$ have shown that a catalytic process is possible under mildly reducing conditions only. It requires the cooperation of powerful reactants with an absolute potential energy of not less than 1.4 eV. Other than a catalytic approach, however, one based on laser chemistry is also workable as described below.

In order to overcome the difficulties of $N_2H_4$ formation by means of direct nitrogen fixation, an energy of activation to promote elementary chemical reactions must be considered for practical applications; that is, in order that the reaction may take place, the stored energy of the system must be raised a certain amount above that of the initial state, or in other words, a potential barrier must be overcome in going from the initial to the final states. This barrier can be high for reactions between saturated molecules; however, it can also be high for reactions in which radicals or free atoms take part, as will be demonstrated for $N_2+2\ H_2=N_2H_4$ that is considered below.

Activation energies were first treated theoretically as an application of quantum mechanics by London [Z. Elektrochem. 35, 552(1929)]. Based on knowledge of the potential curves of the participating diatomic molecules, it is possible to predict the approximate magnitude of the activation energy. A quantitative determination can then be made using the experimental data of enthalpy of formation. In this connection, one may mention that diazene, HN=NH, is a short-lived intermediate of $N_2H_4$ decomposition and possibly also an intermediary of hydrazine formation through $N_2$ fixation. It is important to know its heat of formation in order to calculate the heat of reactions involving $N_2H_2$ as it forms hydrazine. A standard enthalpy of formation for the trans isomer has been measured in a mass spectrometer and calculated from appearance potentials,

$$(\Delta H)^f_{298}=(212\pm 8)\ \text{KJ/mol}$$

[see Foner et al, J. Chem. Phys. 68, 3162 (1978), ibid, P. 3169–3171; Frost et al, J. Chem. Phys. 64, 4719 (1976)]. Some of the earlier reported enthalpy data were those of Willis et al [Can. J. Chem. 54, 1 (1976); ibid, 47, 3007 (1969)], who prepared $N_2H_2$ by microwave discharge in a hydrazine vapor. Their data resulted in a heat of formation of diazene, of $$(\Delta H)^f_{298}=(151\pm 8)\ \text{KJ/mol}$$

The ionization potential of $N_2H_4$ in their tests was found to be $(9.7\pm 0.1)$ eV, and the ionization potential of the $N_2H$ radical was 7.6 eV.

Another contribution to this question is the work by Wiberg, et al [Z. Naturf. 34B, 1385(1979)] who calculated the heat of formation of trans-diazene from ionization and appearance potentials of the molecule fragment to be 134 KJ/mol. The enthalpy of isomerization to iso-diazene is 54 KJ/mol. The N—N and N—H dissociation energies are 510 KJ/mol and 339 KJ/mol, respectively. The energetic relationships between $N_2H_4$ and its dehydrogenation products are shown schematically below This is the energy scheme of dehydrogenation of hydrazine with hydrogen extracted as $H_2$. Diazene is thus in analogy to $N_2H_4$, an endothermic compound, and it is expected to decompose spontaneously.

The above considerations then imply $$N_2H_4 \rightarrow N_2 + 2H_2 + 0.99\ \text{eV} \quad (A)$$

which, in turn, implies that the activation energy for $N_2H_4$ formation from $N_2$ and two hydrogen molecules is 0.99 eV. A comparable amount of energy can be stored in $N_2$ as vibrational energy. In order to have a quantitative description we follow the customary formulation where the energy levels of a diatomic molecule may be written as where $$B_v = B_e - \alpha_e(v+\tfrac{1}{2})+\ldots$$

$$D_v = D_e + \ldots$$

Here v and J are the vibrational and rotational quantum numbers, respectively. In this customary formulation, the constants $\omega_e$, $B_e$, etc., as tabulated for diatomic molecules, are given in units of cm$^{-1}$. For $N_2$, we have $$\omega_e = 2358.57 \text{ cm}^{-1}$$

$$\omega_e x_e = 14.32 \text{ cm}^{-1}$$

$$B_e = 1.99824 \text{ cm}^{-1}$$

$$\alpha_e = 0.017318 \text{ cm}^{-1}$$

$$D_e = 5.76 * 10^{-6} \text{ cm}^{-1}$$

To convert cm$^{-1}$ to eV, one uses 1 eV=8068.3 cm$^{-1}$. For a vibrational quantum number v=4, we have $$E_{v=4, J=0} - E_{v=0, J=0} = 1.13 \text{ eV} > 0.99 \text{ eV}$$

which is larger than the required activation energy, and one should expect that (B)

A method of obtaining $N_2(v=4)$ from $N_2(v=0)$ begins when $N_2(v=0)$ is pumped to $N_2(v=8)$ by two-photon absorption with high energy, short pulse Nd: YAG lasers ($\lambda=1.06$ μm) providing the photons. As will be shown below, under intense laser irradiation, half of the $N_2$ will end up in the v=8 state, while the other half will remain in the v=0 state when the two-state up and down transitions between v=0 and v=8 are saturated. If this excited gas of $N_2$ is subsequently compressed at high pressures (~100 Atm), then because of near-resonant V—V energy transfers an energy equilibrium will be reached when all $N_2$ molecules are in the v=4 state, and no further energy exchanges between these molecules are possible. When $N_2(v=4)$ gas mixes with $H_2$ gas with the molar ratio of 1:2 as in (B) under the conditions of high gas pressure and low temperatures (~300 K), liquid hydrazine will be formed.

One may point out that the physical concept just described is in fact a very common practice in the scientific community. The most prominent example is excimer lasers, such as XeCl and KrF. As is well known, Xe and Kr are inert gases like He, Ne, and Ar; they don't react with other atoms in their ground states. However, when Xe or Kr is pumped to an excited state, it becomes chemically active, and will react with Cl and F to form bound diatomic molecules XeCl and KrF, respectively. Thus the failure to entice $N_2$ to react with $H_2$ can be understood to occur because certain energy conditions are required that are not properly met. My proposed methods to satisfy the required energy condition will thus have important practical consequences.

There remains an important scientific issue concerning how reaction (B) takes place. In addition to energy considerations and the relationship that (A) is a reverse process to (B), a number of intermediate chemical processes occur before the final product, which is $N_2H_4$, forms as in reaction (B). From the known molecular structure of $N_2H_4$, namely, (C)

The intermediate step in reaction (B) must therefore involve an electron transfer process. The experimental evidence as well as the theoretical basis for hydrazine electron transfer (ET) chemistry have been extensively established by a number of investigators. The following review articles and papers contain the scientific information that underlies and supports the present invention:
 (a) S. F. Nelson, "Molecular Structure and Energetics". In Liebman et al, Eds.; VCH Publishers, Inc., Deerfield Beach, Fla., 1986, Vol. 3, Chapter 1;
 (b) S. F. Nelson, Acc. Chem. Res. 14, 131 (1981); and
 (c) K. Kobuta et al, J. Phys. Chem. 86, 602 (1982).

Finally, I wish to point out that hydrazine is in many respects very much like water. The following table compares several important physical properties of those two substances. Also included are the boiling points of $H_2$, $N_2$ and $O_2$. They are, of course, very different from those of $N_2H_4$ and $H_2O$. It appears that hydrazine is suitable to replace gasoline for internal combustion engine if the price is right.

|  | $H_2O$ | $N_2H_4$ | $H_2$ | $N_2$ | $O_2$ |
|---|---|---|---|---|---|
| Molecular Weight, g/mol | 18 | 32 | 2 | 28 | 32 |
| Boiling point, ° C. | 100 | 113.5 | −258 | −196 | −183 |
| Melting point, ° C. | 0 | 1.8 |  |  |  |
| Liquid density, g/cm$^3$ | 1 | 0.997 |  |  |  |
| Vapor pressure, Torr (mmHg) | 25 | 10.4 |  |  |  |
| Dielectric constant | 78.3 | 51.7 |  |  |  |

BRIEF SUMMARY OF THE INVENTION

The present invention is based on a rigorous investigation of the interaction process between a homonuclear diatomic molecule and a radiation pulse and then another homonuclear diatomic molecule. As a result of this investigation, I discovered two methods of directly synthesizing hydrazine by means of nitrogen fixation. The first method uses $N_2$ and $H_2$ as the raw materials for producing $N_2H_4$, while the second method utilizes $N_2$ and $H_2O$ as the raw materials.

It is well known that $N_2$ in its ground state is very inert as in air, and chemically inactive much like He, Ne, Ar, Kr, and Xe. However, when $N_2$ is excited by electron impact or through absorption of radiation, it can readily interact with other molecules just like Kr or Xe in excimer lasers.

For $N_2$ to interact specifically with two $H_2$ to form $N_2H_4$, one cannot utilize an arbitrary excitation of $N_2$. Only a specific excitation can accomplish the desired goal of having good efficiency and practical application of the method. The specific requirement for $N_2$ is to store only enough energy (in slight excess of the activation energy) for the chemical reaction to take place. The activation energy that is needed for $N_2$ to react with $H_2$ to form $N_2H_4$ is 0.99 eV.

The required 0.99 eV of activation energy can be stored in the v=4 vibrational state of $N_2$. This energy can be supplied through absorption of radiation. Since $N_2$ is a homonuclear diatomic molecule which has no permanent electric dipole moment, a single photon absorption with wavelengths in the visible range or longer is forbidden. This explains why the air is transparent to sunlight in the visible range. However, absorption of two photons in $N_2$ is allowed, producing a transition from the ground vibrational sate. This is a common process familiar in nonlinear optics.

A simple calculation can be made to determine the excited vibrational state quantum number v in the ground electronic configuration. However, it should also be pointed out that two-photon absorption processes require high radiation intensity. Because large numbers of $N_2$ have to be excited to have any practical interest, the radiation energy should be high and the radiation itself must be a short pulse. These requirements can be met in the current state of laser technology by high-energy laser in the near infrared to the visible wavelengths. The laser energy per pulse contemplated here is of the order of $10^5$ J/pulse, with a pulse length of one nanosecond or shorter.

Theoretical studies of $N_2$ and Nd: YAG laser pulse interaction reveal that the excited vibrational state (v=8) and the ground vibrational state (v=0) become saturated after absorptions of two laser photons ($\lambda$=1.06 μm), i.e., half of the $N_2$ populate the v=8 state, and the remaining half reside in v=0. If this v=0 and v=8 mixture is compressed, then a resonant vibrational-vibrational (V—V) energy transfer process acts over a short time period to redistribute the vibrational quantum states. Quickly, an energy equilibrium is reached when all molecules occupy the v=4 state, and no further V—V transfer can occur. In this equilibrium, the v=4 state can populate various rotational states with different quantum numbers J. That's where and when energy storage takes place. Further interactions among different J states at v=4 are known as rotational-rotational (R—R) transfer. The final distribution in J is determined by Boltzmann's law at the temperature T of the $N_2$ gas.

The above considerations constitute a two-step technique for generating an $N_2$ gas composed entirely of nitrogen molecules at this v=4 state with the aid of a high-energy short-pulse Nd: YAG laser in the near infrared. The stored energy of $N_2$ at v=4 is about 1.13 eV. This energy is larger than the activation energy (0.99 eV) for $N_2H_4$ formation based on direct synthesis of $N_2H_4$ by nitrogen fixation with $H_2$. The subsequent interaction of the excited $N_2$ vibrational state (v=4) with two hydrogen molecules takes place rapidly through an electron transfer (ET) mechanism that is followed by a dissociative recombination process under high pressure and low-temperature gas conditions. For simplicity, this method is hereinafter referred to as the "dry" hydrazine process.

In another method of $N_2$ fixation, a gas of excited $N_2$ is made to interact with $H_2O$. For simplicity, this method is hereinafter referred to as the "wet" process. An analysis similar to the one just described can likewise be carried out. This method is based on the observation that the combustion of $N_2H_4$, i.e., $N_2H_4+O_2$, produces $N_2+2H_2O+6.02$ eV. The reverse of this process occurs when $N_2$ is make to store the energy of 6.02 eV. A two-photon absorption from a 0.4 μm laser (the shortest visible blue) will pump the $N_2$ ground vibrational state to v=25 in the ground electronic configuration. This highly excited $N_2$ is energetic enough to cause the dissociation of $2H_2O$ into $2H_2+O_2$ while ending up in the v=4 state. In this state it can then proceed to react with $H_2$ to form $N_2H_4$ as in the first dry method of direct synthesis. The ways and means of $H_2O$ dissociation by $N_2$ in the v=25 state are the reverse of the hydrogen combustion processes and are well known by chemists. In order to get the highest possible $H_2O$ molecule density, one must interact liquid water ($\sim 10^{22}/cm^3$) with an $N_2$ gas that is pumped into the v=25 vibrational state.

It is essential that in the "wet" case of $N_2$ fixation with $H_2O$, the $N_2$ should be maintained throughout the processes at ordinary pressures. At high pressures exceeding several atm, e.g., loss of $N_2$ at v=25 occurs due to V—V transfer, where some of $N_2$ will end up with v<25. Such collisional energy transfers will deplete $N_2$ molecules of the energy need to dissociate $H_2O$. It is tempting to avoid this type of energy redistribution by raising the photon energy. But this encounters two problems: first, the laser will have shorter wavelength where both optics and laser itself are more difficult to come by, and second, high-energy two-photon absorptions lead to $N_2$ dissociation (the dissociation energy is 7.37 eV). If a single photon absorption is used, the photon energy is about 8.59 eV, putting the $N_2$ in the first excited electronic configuration. This state has a very short radiative lifetime ($\sim 10^{-6}$ sec or shorter) due to spontaneous emission of a single photon. In contrast, the radiative lifetime of excited vibrational states that are in the ground electronic configuration is very long ($\sim 10^3$ sec or more). These decays result from spontaneous emission of two photons. Thus in the present "wet" invention there is no loss of excitation through radiative emissions.

Hydrazine can also be made by procedurally reversing the "dry" process previously described with gaseous hydrogen as the source thereof. Hydrogen molecules in a hydrogen pressure tank are attacked by short-pulse laser photons which have been emitted by a high-energy laser generator and then laser energy is greatly increased through a laser amplifier with an energy of $10^6$ Joules per pulse, whereby the hydrogen molecules, existing in the ground vibrational state, absorb two high-energy laser photons with $10^{10}$ Watts/$cm^2$ of pulse intensity and can easily surmount the vibrational energy barrier to become hydrogen molecules in the excited vibrational state. When nitrogen molecules are admixed with the excited hydrogen molecules, hydrazine, $N_2H_4$, is readily produced.

BRIEF DESCRIPTION OF THE DRAWINGS

These and other features of the present invention are more fully set forth below in the accompanying detailed description, presented solely for purposes of exemplification and not by way of limitation. In the accompanying drawings, of which.

DETAILED DESCRIPTION OF THE INVENTION

Figure 1:
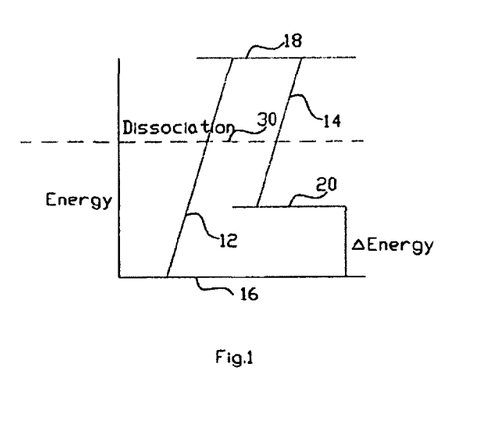
FIG. 1 is an energy level and transition diagram useful in explaining the present invention.

The present invention contemplates a system of photoexcitation and chemical reaction in which an enhanced polyatomic molecule formation efficiency is achieved, that is, more molecules are formed with a minimum of energy input. In particular, photoexcitation occurs through absorption of two photons by an $N_2$ molecule. Following this photoexcitation, polyatomic molecules are formed in accordance with the method of excited-state laser chemistry. The process thus described is illustrated in FIG. 1 showing first and second energy steps, 12 and 14, starting from a ground state, 16, and proceeding to an intermediate excited state, 18, and ultimately ending in a highly excited state, 20. The intermediate state, 18, belongs to the first excited electronic configuration. The transition through this state is nonresonant. Additionally it is desired and deemed preferable to also excite molecules from other low-lying energy states, such as the different rotational states with quantum number J belonging to the ground vibrational state with quantum number v=0 in the ground electronic configuration. All two-photon transitions connecting different rotational states are energetically close to each other due to the selection rules for rotational transitions ΔJ=0, ±1, ±2 in two-photon absorptions and the smallness of the rotational constant for $N_2$.

Intense laser radiation is employed here to produce the transitions 12 and 14. It illuminates a gas of $N_2$ molecules at approximately one atm pressure, and the laser intensity is chosen to efficiently excite $N_2$ molecules to a highly excited vibrational state belonging to the ground electronic configuration through absorptions of two laser photons. The photon energy can be determined once the molecules needed to interact with $N_2$ (v≠0) are known.

In the above description, I considered only the two-photon absorption process by $N_2$. This is the lowest energy possible for radiation absorption by $N_2$ at visible wavelengths or longer. A single-photon absorption is forbidden since $N_2$ is a homonuclear molecule having no permanent electric dipole moment. Only the above wavelengths are required since the photon energy must not exceed 3.5 eV. For photon energy larger than 3.5 eV, the efficiency for hydrazine production is degraded because of excessive heat production. The two-photon absorption process depicted in FIG. 1 is $$N_2(v=0) + 2h\nu \rightarrow N_2(v \neq 0)$$

where $N_2(v=0)$ is the initial ground vibrational state denoted as 16 in FIG. 1, $N_2(v \neq 0)$ is the final vibrational state denoted by 20 in FIG. 1, and hν is the single-photon energy from a high-energy pulsed laser. The probability of transitioning from the initial state to the final state at the end of the pulse time τ is

$$P_{i \rightarrow f} = \frac{4\xi^2}{\Delta\nu^2 + 4\xi^2} \sin^2\left(\frac{\tau}{2}\sqrt{\Delta\nu^2 + 4\xi^2}\right) \quad (2)$$

where $$\Delta\nu = E_\nu - E_0 - 2h\nu$$

$$\xi = \pi\alpha_g I \quad (3)$$

$\alpha_g$ is the ground electronic state polarizability, I is the laser intensity, and ν is the laser frequency. For $N_2$, $\alpha_g = 1.7 \times 10^{-24}$ cm$^3$ In practical applications as will be made clear later, the laser intensity must be large enough to have $$2\xi \gg |\Delta\nu| \quad (4)$$

and $$\xi\tau \gg 1 \quad (5)$$

Expression (5) may be rewritten as $$\pi\alpha_g \tilde{E}_L \gg 1 \quad (6)$$

Expression (4) is the condition for a near-resonant absorption where the power broadening parameter 2ξ is much larger than the energy offset (frequency detuning), and $$\tilde{E}_L = I\tau \quad (7)$$

is the laser pulse energy fluence. Let $\epsilon_L$ be the laser energy per pulse and A be the cross sectional area of the laser beam, then $$\left. \begin{array}{l} \tilde{E}_L = \epsilon_L / A \\ I = \epsilon_L / (A\tau) \end{array} \right\} \quad (8)$$

Under the conditions defined by expressions (4) and (5), the transition probability is $$\langle P_{i \rightarrow f} \rangle = \frac{1}{2}$$

on average. This means that half of $N_2$ molecules is in the excited vibrational state v and the remaining half is in the ground vibration state v=0.

As an example, consider one mole of $N_2$ interacting with a high energy Nd: YAG laser for which λ=1.06 μm and hν=1.12 eV. One mole of $N_2$ consists of $N_A$ molecules having a total mass of 28 grams, where $$N_A = 6.02 \times 10^{23}$$

is Avogadro's number. The total number of absorbed photon must be $N_A$; thus the laser energy per pulse must be $$\epsilon_L > N_A h\nu = 6.7 \times 10^{23} \text{ eV} \approx 10^5 \text{ J} \quad (9)$$

Let A=10$^3$ cm$^2$, τ=10$^{-9}$ sec, then $$\tilde{E}_L > 100 \text{ J/cm}^2$$

$$I > 10^{11} \text{ W/cm}^2$$

It is convenient to work in units such that h/2π=c=1, then

1 W/cm$^2$=10$^{13}$ cm$^{-4}$

1 J/cm$^2$=3×10$^{23}$ cm$^{-3}$

Using the laser intensity 10$^{11}$ W/cm$^2$ we get for $N_2$, the power broadening 2ξ in Eq. (13), 2ξ=12 cm$^{-1}$ For a given laser frequency, ν, Δν is slightly different for transitions involving different rotational quantum numbers J. If (4) is not satisfied for most J of interest, one may increase laser intensity I for a given pulse energy, $\tilde{E}_L$, by decreasing the pulse length τ through the well known pulse compression technique. For example, if τ is compressed or shortened from 1 ns to 0.1 ns, then 2ξ=120 cm$^{-1}$; (4) will be satisfied for all J, since the rotational constant Be for $N_2$ is small (Be=1.99 cm$^{-1}$).

Note that (5) does not depend on the pulse length τ. For $\tilde{E}_L$=100 J/cm$^2$, we have $$\pi\alpha_g \tilde{E}_L = 56\pi \gg 1$$

Therefore, (6) remains satisfied.

The two-photon absorption calculations considered so far are good approximations when the gas pressure is low and a collision-induced single-photon absorption process by a single molecule may be ignored. Two-photon resonant state transitions at best produce a 50% excited vibrational state population when the pulse intensity is sufficiently high. This is achievable for subnanosecond pulses and ultimately is exploitable for commercial and industrial applications. One anticipates that such a partially excited molecular system can be made to quickly reach a new equilibrated vibrational level under sufficiently high pressure (~100 atm) in which state no further V—V energy transfer can occur. In the above example using Nd: YAG laser (1.06 μm), the final vibrational quantum number reached is v=4. The corresponding state into which two photons are absorbed is v=8 as mentioned earlier.

Let us denote the type of excited $N_2$ by $N_2^*$ when almost all $N_2$ molecules reside in the excited vibrational state v=4 as a result of vibrational energy redistribution. The interaction of $N_2^*$ with $H_2$ gas to produce $N_2H_4$ is then accomplished by means of dissociative recombination aided by an electron transfer mechanism in the following manner, (10a)

(10b)

(10c)

(10d)

Here $(H_2N_2^*H_2)$ in (10a) is a molecular complex, which, due to the van der Waals force, is followed by electron transfer from $N_2^*$ to $H_2$ as in (10b), an intramolecular relaxation, and a subsequent relaxation from dissociative recombination. This is shown as a two-step transition from (10b) to (10c), a dissociation of $H_2^-$, and from (10c) to (10d), final recombination to form $N_2H_4$. All this chemistry can be effective since $N_2^*$ stores an amount of energy that is greater than the activation energy (0.99 eV), and can be made to take place efficiently if the pressure (~100 atm) is sufficiently high, and the temperature (~300° K) is kept low enough by heat transfer, such as by cooling with water. This is due to the facts that the formation of molecular complexes is strongly pressure dependent, since it requires a three-body interaction, and that the time for interaction must be long enough, which can be attained only at relative low temperatures.

Figure 2:
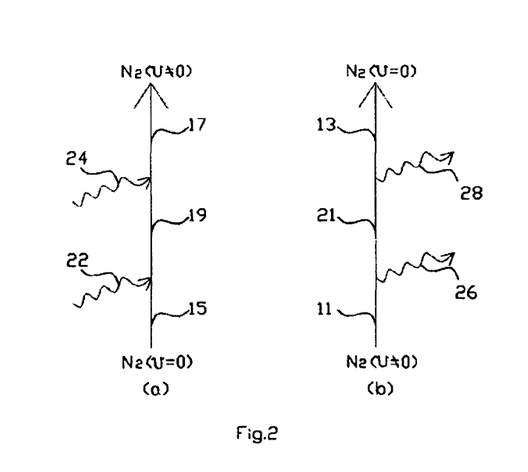
FIG. 2 is a diagram, generally called a Feynman diagram, illustrating (a) a two-photon absorption process and (b) a two-photon emission process, with typical vibrational states of $N_2$ indicated.

It is perhaps useful to explain how the transition probability given in Eq. (2) is obtained. The elementary processes responsible for a transition of this kind are depicted in FIGS. 2(a) and 2(b). In FIGS. 2(a) and 2(b), the solid lines with arrows represent an $N_2$ molecule, and an arrowed wavy line represents a photon being absorbed (toward the solid line) or emitted (away from the solid line). FIG. 2(a) illustrates absorption of two photons, 22 and 24, by $N_2$ which is in ground vibrational state v=0 designated as 15. In the first photon absorption, 22, $N_2$ transitions to the non-resonant intermediate state 19 (belonging to the first excited electronic configuration). In the second photon absorption, 24, $N_2$ moves into the vibrational state, 17, with v=0. Both states, 15 and 17, for $N_2$ are ground electronic configurations. FIG. 2(b) is the reverse process of FIG. 2(a) wherein absorptions in FIG. 2(a) become emissions in FIG. 2(b). The description of FIG. 2(b) parallels that of FIG. 2(a) in a straightforward manner (emission replacing absorption) and will not be repeated here, except to note that 21 is the same as 19, both belonging to the first excited electronic configuration of $N_2$. Furthermore, it should be noted that FIG. 2(a) describes a process that cannot take place in the absence of external radiation, but the FIG. 2(b) process can take place even when no external radiation is present.

It is important to known how long the $N_2$ molecules will stay in the excited vibrational state after a two-photon absorption. The lifetime needs to be sufficiently long to have practical interest. When the gas pressure is sufficiently low, the fundamental loss mechanism of $N_2$ excited vibrational states is through the spontaneous emission of two photons. The Feynman diagram corresponding to this situation is given in FIG. 2(b). The two photons, 26 and 28, can be different. The first photon 26 is labeled by $(\vec{\kappa}_1, \hat{e}_1)$, and the second photon 28 is labeled by $(\vec{\kappa}_2, \hat{e}_2)$, where $\vec{\kappa}_1$ and $\hat{e}_1$ denote the photon wave vector and unit polarization vector, respectively. For completeness, one briefly summarizes the calculation of the spontaneous two-photon emission rate and the associated lifetime of an excited vibrational state in the ground electronic configuration as follows.

Using the Feynman rules, one finds that the transition amplitude for spontaneously emitting two photons from the excited vibrational state |i> to the ground vibrational state |f> corresponding to FIG. 2(b), is given by $$A_{fi}(\vec{k}_1, \hat{e}_1; \vec{k}_2, \hat{e}_2) = \frac{2\pi e^2}{\sqrt{2k_1 V}\sqrt{2k_2 V}} M_{fi} \delta(E_i - E_f - k_1 - k_2)$$

where $$M_{fi} = \frac{1}{m^2} \sum_n \frac{\langle i|\vec{p}\cdot\hat{e}_1 e^{i\vec{K}_1\cdot\vec{r}}|n\rangle\langle n|\vec{p}\cdot\hat{e}_2 e^{i\vec{k}_2\cdot\vec{r}}|f\rangle}{E_i - E_n - k_1}(\vec{k}_1\hat{e}_1 \leftrightarrow \vec{k}_2\hat{e}_2, k_1 \leftrightarrow k_2)$$

The two-photon spontaneous emission rate $\gamma_v$ is $$\gamma_v = \sum_{\hat{e}_1}\sum_{\hat{e}_2} V\int\frac{d^3k_1}{(2\pi)^3} V\int\frac{d^3k_2}{(2\pi)^3} |A_{fi}(\vec{k}_1, \hat{e}_1; \vec{k}_2, \hat{e}_2)|^2 \frac{}{t}$$

With the usual substitution, $$[2\pi\delta(E_i-E_f-k_1-k_2)]^2 = 2\pi t\delta(E_i-E_f-k_1-k_2)$$

and the fact that $E_n$ is the energy of the first excited electronic configuration or higher, which implies $$E_n-E_i \gg k_1 \text{ or } k_2$$

one may approximate the matrix element $M_{fi}$ as $$M_{fi} = 2\sum_n \frac{\langle i|\hat{k}_1\cdot\vec{r}|n\rangle\langle n|\vec{k}_2\cdot\vec{r}|f\rangle}{E_i - E_n}$$

where the dipole approximation has been made. Let the ground electronic polarizability be $\alpha_g$, where $$\alpha_g = \frac{e^2}{4\pi}\sum_n \frac{\langle i|z|n\rangle\langle n|z|f\rangle}{E_n - E_i}$$

and for $N_2$, $\alpha_g = 1.7\times10^{-24}$ cm$^3$ as before.

Carrying out the $\vec{\kappa}_1$ and $\vec{\kappa}_2$ integrations, we have finally the expression $$\gamma_v = \frac{8\omega_v^7}{315\pi}|\alpha_g|^2 \quad (11)$$

where $$\omega_v = E_f - E_i = E_v - E_o$$

In the case of $N_2$ fixation with $H_2$ as catalyzed by two-photon absorption of Nd:YAG laser radiation, one has that $$\lambda = 1.06 \ \mu m$$

$$\nu = 9432 \ cm^{-1}$$

and $$\omega_v = 2(2\pi\nu)$$

corresponds to $v=8$. The lifetime $\tau_v$ for $v=8$ quantum state against spontaneous emissions of two photons is thus found from (11) to be $$\tau_v = \gamma_v^{-1} = 15 \ days$$

Therefore, at ordinary gas pressures, there is no excitation loss resulting from emissions of two photons. This two-photon lifetime is very long in contrast to the much shorter single-photon spontaneous emission lifetimes which are typically of the order of $10^{-6}$ to $10^{-9}$ seconds. It is also seen to be much longer compared to the process time envisioned here for $N_2H_4$ production, or to other de-excitation processes due to collisions of various kinds when the gas pressure is high, e.g. ~100 atm. We will address the issue of collision rates below.

High $N_2$ gas pressure is needed for $N_2$ fixation with $H_2$ because the V—V transfer that produces the $v=4$ vibrational energy distribution has improved efficiency as the pressure increases. It is therefore appropriate to briefly describe the physics involved. The best way to illustrate the interaction is to employ the Feynman diagrams shown in FIG. 3, commonly referred to as ladder diagrams. In contrast to FIG. 2, the unarrowed wavy lines refer to virtual photons. The interaction of two ground electronic state molecules of homonuclear type must at least involve the exchange of two virtual photons, 35 and 45. The other directed solid lines have the same interpretation as in FIG. 2. Thus the internal solid lines 36, 37, 46, and 47 refer to $N_2$ in its first excited electronic configuration or higher. The remaining portions of the drawing, namely, 31, 33, 32, 34, 41, 43, 42, and 44, have the same meaning as 15, 17, 11, and 13 in FIG. 2.

Figure 3:
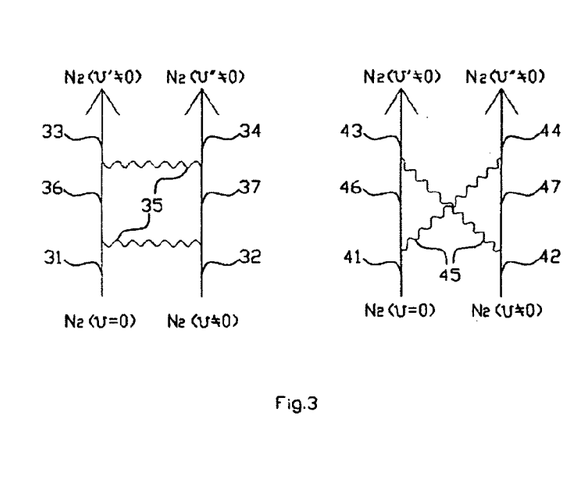
FIG. 3 is also a Feynman diagram involving two $N_2$ molecular interactions in the lowest ladder approximation. It illustrates the resonant V—V energy transfer useful in explaining the $N_2$-fixation with $H_2$.

The calculation of the V—V energy transfer rates is carried out in similar fashion to the calculation of the spontaneous two-photon emission rate $\gamma_v$, considered earlier, except that the algebra is lengthy and tedious. The actual evaluation requires computer work involving numerical integrations of multiple integrals. One will not reproduce the detail here and only state that at ordinary gas pressure and temperature, the V—V transfer rate is about 0.03 $sec^{-1}$. Thus the collisional energy transfer limited lifetime is of the order of 30 sec. In order to shorten the process time of $N_2$ fixation with $H_2$, therefore, the $N_2$ gas should be compressed to a pressure of 100 atm or more. At this pressure, the vibrational population redistribution time is only about one second or less.

Figure 4:
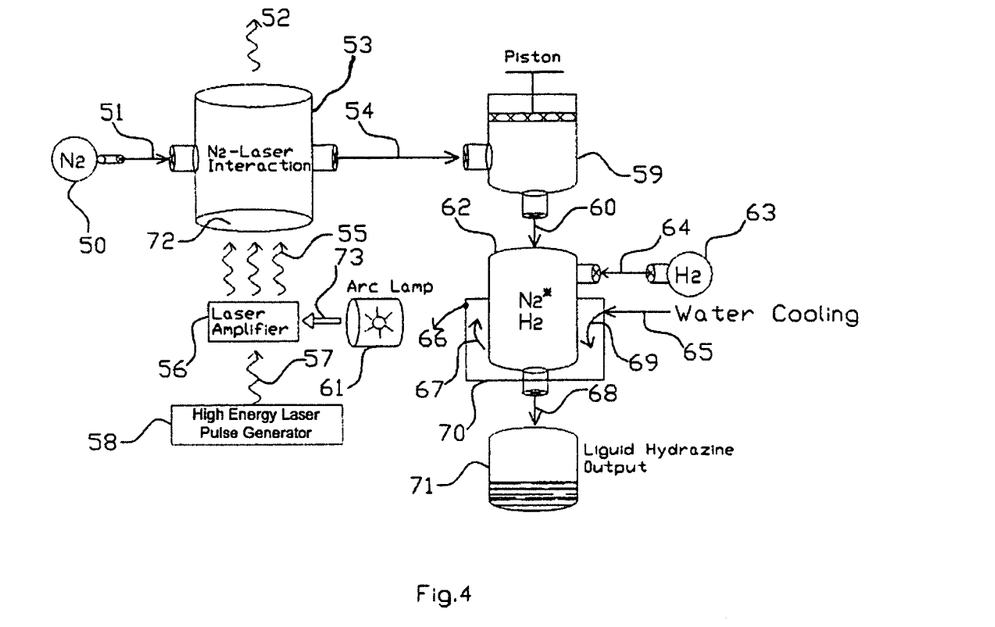
FIG. 4 is a diagram of the apparatus and processes involved in the dry method 1 of the present invention based on $N_2$ fixation with $H_2$.

The process for producing $N_2H_4$ using $N_2$ and $H_2$ as raw materials will now be described. This process is shown in FIG. 4. The $N_2$ source 50 may come from the evaporation of liquid nitrogen. Flow duct 51 that directs the $N_2$—laser interaction chamber 53, which is equipped with an optical window 72 having a cross-sectional area equal to the laser beam size. A high-energy laser pulse generator 58 emits photons 57 that enter the laser amplifier 56, which is being pumped by an arc lamp 61 that emits light 73 in the desirable spectral range. The arc lamp radiation is absorbed and stored in the laser amplifier 56. The working medium in 56 may be either a gas or liquid dye of suitable kind for the desired spectral range. On passing through the laser amplifier, the outgoing laser photons 55 acquire the needed intensity and enter the window 72 to interact with the $N_2$ molecules in 53 where each $N_2$ absorbs two laser photons. After interaction, any unabsorbed photons 52 then leave the interaction chamber 53. The $N_2$ gas, after laser pulse interaction in 53, then flows through duct 54 and enters the high-pressure gas chamber 59 operated at 100 atm or more. Gas chamber 59 is equipped with a piston to handle high-pressure gas operations. After compression, the gas leaves 59 through duct 60 and is introduced into vessel 62 where hydrogen flows from source 63 through duct 64. The $N_2$ and $H_2$ interaction chamber 62 is surrounded by a cooling system 70. Water flows through duct 65 passing through 69 and 67, and leaves through duct 66. This water cooling system also includes a heat exchanger (not shown). The final hydrazine product is collected at container 71 through duct 68.

One now moves on to consider in the present invention a second method of "wet" hydrazine synthesis using $N_2$ and $H_2O$ as raw materials. It is well known that hydrazine can be used as a rocket propellant and as a corrosion inhibitor for steel structures that are in contact with hot water. These uses stem from the facts that hydrazine is an endothermic compound ($\Delta_f H°_{298}$=95.4 KJ/mole), and that the following reaction, is exothermic by 580 KJ/mol or 6.02 eV/molecule. Reaction (12) then suggests a reverse reaction of the form, if the vibrational energy stored in $N_2^{}$ is greater than 6.02 eV/molecule. It is clear, from the earlier discussion concerning hydrazine formation using $N_2$ and $H_2$ as raw materials, that the intermediate chemical reaction in (13) must involve the dissociation of $H_2O$ by $N_2^{}$, namely, It now follows from (10) that $N_2^*$ has a stored vibrational energy greater than the 0.99 eV activation energy for hydrazine formation, since this reaction completes the process of forming hydrazine from $H_2O$.

In order to determine the vibrational states associated with $N_2^{**}$ and $N_2^*$, and also to elucidate the mechanism of $H_2O$ dissociation by $N_2^{**}$ in (14), it is useful to begin with the combustion of $H_2$ described by $$2H_2 + O_2 \longrightarrow 2H_2O \text{ (gas)} + 4.95 \text{ eV} \tag{15}$$

Reaction (14) is closely related to the reverse reaction (15). A careful analysis of the $H_2$ combustion will thus help one understand (14).

It is known that (15) does not occur simply by the collision of two hydrogen molecules with an oxygen molecule. Indeed the observation of OH bands in an oxyhydrogen flame (known as chemiluminescence) shows that OH radicals play an important part in the reaction. One is led to postulate that the following two-step elementary reactions go into the formation of $H_2O$.

$$H + O_2 + H_2 \longrightarrow H_2O + OH + 4.29 \text{ eV} \tag{16}$$

$$OH + H_2 \longrightarrow H_2O + H + 0.66 \text{ eV} \tag{17}$$

This means that H atoms need to be formed (e.g., by ignition), and that each H atom produces an OH radical and an $H_2O$ molecule according to (16). Each OH radical, in turn, forms an $H_2$ molecule and regenerates an H atom according to (17). Process (16) can begin again and we see that H atoms are needed to catalyze the formation of $H_2O$ from the combustion of $H_2$.

Now in the case of reaction (14), we use the v=25 state of $N_2^{}$ to catalyze the reverse reaction. This stores the required energy to allow the present invention to work. The $N_2^{}$ is found to have energy of 6.15 eV above the ground state. The dissociation of $H_2O$ into H and OH takes 5.14 eV. This means that $N_2^{**}$ will lose 5.14 eV of its vibrational energy in catalyzing the reaction. Thus it will make transition from v=25 to a v=3 state that has associated with it some rotational quantum number J, such that $$E_{3,J}=1.16 \text{ eV}$$

according to the energy conservation requirement. If we now assume that H atoms are needed within our system to initiate a chain reaction of the kind similar to the $H_2$ combustion above, then similar to (17), we have $$N_2^{**} + H_2O + H \longrightarrow N_2' + OH + H_2 \tag{18}$$

where $N_2'$ is in the vibrational state with v=22. Likewise, from the reverse reaction (16), $$N_2' + H_2O + OH \longrightarrow N_2^* + O_2 + H_2 + H \tag{19}$$

where $N_2^*$ is in the vibrational state with v=4.

It should be pointed out that in (18) and (19), because of the requirement of energy conservation, in addition to the vibrational quantum number v, a rotational quantum number J must also be determined. Using $E_{v,J}$, the molecular energy level, the same as Eqs. (1), then for (18) and (19) to go, we must have $$E_{25,J'} - E_{22,J'} = 0.62 + \Delta E_{J,J'}{}^{(1)}$$
$$E_{22,J'} - E_{4,J''} = 4.4 + \Delta E_{J',J''}{}^{(2)} \tag{20}$$

With the aid of Eq. (1), one can then find the required J, J' and J" values that satisfy $$\Delta E_{J,J'}{}^{(1)} = 0.04 \text{ eV}$$

$$\Delta E_{J1,J''}{}^{(2)} = -0.11 \text{ eV}$$

Thus a catalytic chain reaction for (14) exists in analogy to (15). Adding (18) and (19), we obtain (14) with $N_2^*$ having the vibrational-rotational energy of 1.13 eV relative to the ground vibrational-rotational state. Subsequently one obtains Eq. (10) since the energy available from $N_2^*$ is greater than the hydrazine activation energy of 0.99 eV.

The theoretical description just made implies that we must use the shortest visible high-power blue laser, which has a wavelength near 4000 Å, with corresponding single-photon energy $$h\nu = 3.1 \text{ eV}$$

The two-photon absorption required will then pump the $N_2$, v=0 state into v=25, which has energy 6.10 eV above the v=0 state. The two-photon spontaneous radiative lifetime of the v=25 state can likewise be computed. One finds from (11) that $$\tau_{25} \approx 2200 \text{ sec} \approx 37 \text{ min}.$$

One thus expects no excitation loss to the spontaneous radiative emission process. However, it is important to estimate loss due to possible collisional deactivations, the most important one being V—V transfer. This is again caused by the saturated nature of the two-photon absorption process between v=0 and v=25 states, when a pulse laser intensity of $\sim 10^{11}$ W/cm$^2$ is used. The V—V transfer rate on the basis of the process depicted in FIG. 3 is found to be of the order of 0.01 sec$^{-1}$ at an $N_2$ density of $\sim 10^{19}$ cm$^{-3}$. The de-excitation time is then about 100 sec, which is considerably longer than the processing time for $N_2H_4$ production that is envisaged here. However, were $N_2$ to be raised in pressure by two orders of magnitude as in the first method of hydrazine production, the $N_2^{**}$ loss would not be negligible. Thus in the actual practice of the art for $N_2$ fixation with water, the $N_2$ density must be kept at $10^{19}$ cm$^{-3}$ or lower.

The laser energy requirement at $\lambda=4000$ Å may likewise be computed for the production of a given quantity of $N_2H_4$. The result is similar to the one for $N_2$ fixation with $H_2$.

Figure 5:
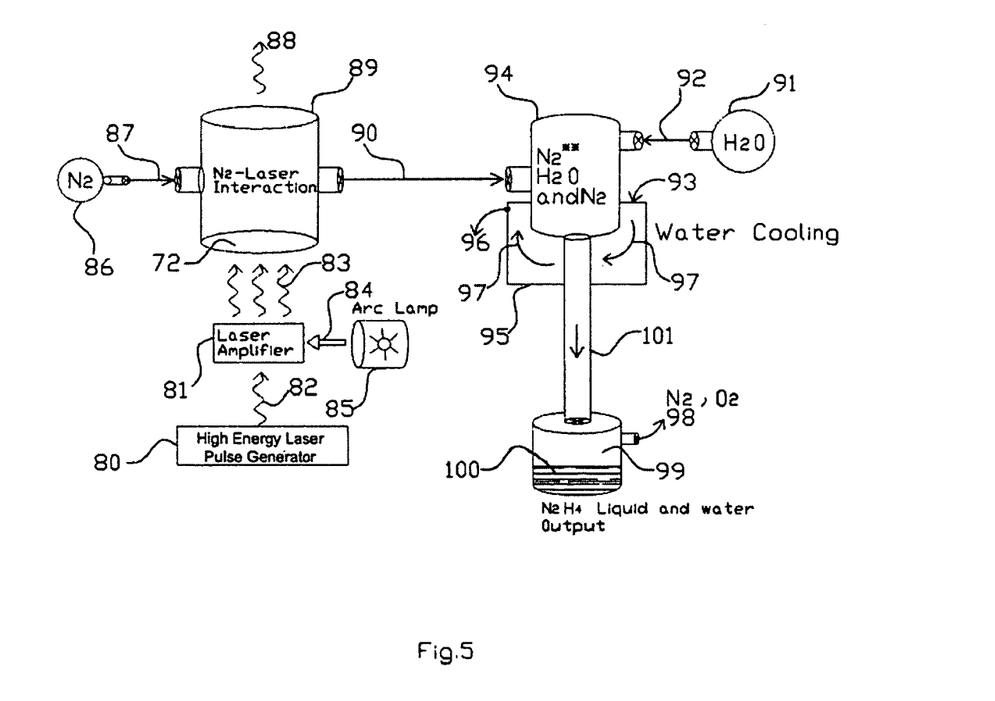
FIG. 5 is a diagram of the apparatus and processes involved in the wet method 2 of the present invention based on $N_2$ fixation with $H_2O$.

Now that the process and parameters for practicing $N_2$ fixation with water have been described, the structure useful for practicing it needs to be described. With reference to FIG. 5, a high-energy pulsed-laser source 80 is shown with photons 82 entering laser amplifier 81 which in turn is pumped by flashlamp 85 generating radiation with the desired spectral range that enters amplifier 81 through optical system 84. Photons 83 after laser amplification then go through window 72 of equal area as in FIG. 4. The window material in the present method is different from the first method shown in FIG. 4. The window material for the first method in FIG. 4 must be made suitable for red to far infrared radiation transmission, while for FIG. 5 it must be transparent to blue-purple light.

The photons 83 then interact with $N_2$, which originates from a nitrogen source 86 that goes through duct 87 and enters into the $N_2$—laser interaction chamber 89. Any leftover outgoing photons after interaction are indicated as 88. The gas then leaves through duct 90. It consists of half of the molecules in the excited vibrational state and the remaining half in the normal ground state. It flows into a vessel 94. Pure water from input 91 flowing through pipe 92 also enters into 94. The water cooling system 95 with water from 97 and recirculating system 96 is the same as in FIG. 4. After the $N_2$—$H_2O$ mixture interacts in the vessel 94, $N_2H_4$ liquid is formed. The liquids consisting of $N_2H_4$ and water then fall through the air duct 101 into vessel 99 in which liquid $N_2H_4$ and water remain in the bottom of the tank 100, while $N_2$ and $O_2$ bubble out through valve 98.

The above-described method and apparatus is intended to be exemplary only of the invention which is to be limited only in accordance with the following claims.

What is claimed is:

1. A process for producing hydrazine with nitrogen and hydrogen as raw materials, comprising the steps of:
   (A) generating photons from a high-energy laser pulsed source, with pulse energy at least $10^5$ J per pulse;
   (B) passing said photons through a laser amplifier pumped by an arc lamp to produce photons with increased pulsed intensity, with pulse intensities at least $10^{11}$ W/cm$^2$;
   (C) introducing said intensified pulsed laser photons to excite nitrogen molecules from said nitrogen raw materials through two-photon absorptions so that said nitrogen molecules are induced to make transitions from a ground vibrational state thereof to excited vibrational states;
   (D) flowing said excited nitrogen molecules to a high-pressure vessel so as to cause effective collisional-mixing leading to a new vibrational energy state;
   (E) flowing said nitrogen molecules at said new vibrational energy state from said high-pressure vessel to a container containing hydrogen from said hydrogen raw materials which reacts with said new vibrationally excited nitrogen molecules to form hydrazine; and
   (F) cooling said hydrazine and leading to a liquid form of output.

2. The process of claim 1 wherein said high-energy laser pulsed source has photon wavelengths from longest visible red to near infrared wavelengths between 0.76 μm and 1 μm.

3. The process of claim 2 wherein said high-energy laser pulsed source includes a Nd: YAG laser.

4. The process of claim 1 wherein said high-energy laser pulsed source has a pulse length at least 0.1 nanoseconds.

5. The process of claim 1 wherein said arc lamp includes a flashlamp.

6. The process of claim 5 wherein said flashlamp is a cesium-neon arc lamp.

7. The process of claim 1 wherein said hydrogen and said nitrogen have a molecular ratio of 2:1.

8. The process of claim 1 wherein cooling is conducted with a cyclic water flow system equipped with a heat exchanger.

9. The process of claim 1 wherein said hydrazine is cooled to a temperature no higher than 300° K.

10. A process for producing hydrazine with nitrogen and water as raw materials, comprising the steps of:
    (A) generating photons from a high-energy laser-pulsed source, with pulse energy at least $10^5$ J per pulse;
    (B) producing photons with increased pulse intensity after traversing a laser amplifier pumped by an arc lamp, with pulse intensities at least $10^{11}$ W/cm$^2$;
    (C) introducing said intensified pulsed laser photons to excite nitrogen molecules from said nitrogen raw materials through a two-photon absorption process so that said nitrogen molecules are induced to make transitions from a ground vibrational state thereof to excited vibrational states;
    (D) flowing said nitrogen, after said laser pulse excitation to produce excited nitrogen, into a vessel containing water so as to have good mixing between said excited nitrogen and said water; and
    (E) providing an outlet so that gas molecules consisting of $O_2$ and $N_2$ can bubble out.

11. The process of claim 10 wherein said high-energy laser-pulsed source includes a XeCl excimer laser.

12. The process of claim 10 wherein the photons used are in shortest visible blue with wavelength of 0.4 μm.

13. The process of claim 10 wherein the photons used have wavelengths between 0.35 μm and 0.4 μm.

14. The process of claim 10 wherein the photons have a pulse length at least 0.1 nanoseconds.

15. The process of claim 10 wherein said arc lamp includes a flashlamp.

16. The process of claim 15 wherein said flashlamp is a lithium-argon arc lamp.

17. The process of claim 10 wherein said water molecules and said nitrogen molecules have a molecular ratio of at least 2:1.

18. The process of claim 10 wherein said outlet comprises a cyclic water-flow system equipped with a heat exchanger utilizing water operating at room temperature.

* * * * *